United States Patent
Kuo et al.

(12)

(10) Patent No.: US 6,476,808 B1
(45) Date of Patent: Nov. 5, 2002

(54) TOKEN-BASED BUFFER SYSTEM AND METHOD FOR A GEOMETRY PIPELINE IN THREE-DIMENSIONAL GRAPHICS

(75) Inventors: Dong-Ying Kuo, Pleasanton; Mike Hong, San Jose; Fred Liao, Union City, all of CA (US)

(73) Assignee: S3 Graphics Co., Ltd. (KY)

( * ) Notice: Subject to any disclaimer, the term of this patent is extended or adjusted under 35 U.S.C. 154(b) by 0 days.

(21) Appl. No.: 09/419,699

(22) Filed: Oct. 14, 1999

(51) Int. Cl.$^7$ .............................................. G06T 15/00
(52) U.S. Cl. ...................................................... 345/422
(58) Field of Search ................................. 345/419, 420, 345/421, 422, 619, 620, 621

(56) References Cited

U.S. PATENT DOCUMENTS 5,144,291 A * 9/1992 Nishizawa .................. 345/422
6,111,582 A * 8/2000 Jenkins ....................... 345/421
6,268,875 B1 * 7/2001 Duluk et al. ................ 345/506

* cited by examiner

Primary Examiner—Phu K. Nguyen
(74) Attorney, Agent, or Firm—Carr & Ferrell LLP (57) ABSTRACT

A token-based buffer system for a geometry pipeline in three-dimensional graphics comprises: a buffer control initialization (BCI) unit, a new token or index module, a geometry control pipeline, a vertex buffer, and a processing engine. The token-based buffer system provides a shared resource environment in which tokens are assigned for blocks of data. Each block of data includes that data necessary for each unit or stage in the geometry pipeline to perform its computation. The use of tokens is advantageous because it optimizes the storage efficiency for storing the blocks of data and ensures the correctness of the data as it is passed between stages.

26 Claims, 11 Drawing Sheets

TOKEN-BASED BUFFER SYSTEM AND METHOD FOR A GEOMETRY PIPELINE IN THREE-DIMENSIONAL GRAPHICS

BACKGROUND OF THE INVENTION

1. Field of the Invention

The present invention relates generally to the field of computer graphics. In particular to systems and method for generating and rendering images in three-dimensional graphics. More particularly, the present invention relates to a system and method for managing buffer space using tokens for a geometry pipeline of a graphics subsystem.

2. Description of the Background Art

Graphics systems and processors are well known in the art. There has been an increasing demand for graphics that are more realistic. The prior art has attempted to satisfy this demand with graphics systems that for render three-dimensional objects. The rendering of three-dimensional objects requires a greater number of computations and transformations such as shading, lighting, projection, perspective and texturing. However, one problem in the prior art is providing enough computational power and storage area to perform graphics operations. The computational requirement for such computation has increased as the number of bit per pixel has increased. This is particularly a problem in the manufacture of graphics controllers that are often formed on a single chip, and therefore, are limited in the storage area and processing power available.

Figure 1:
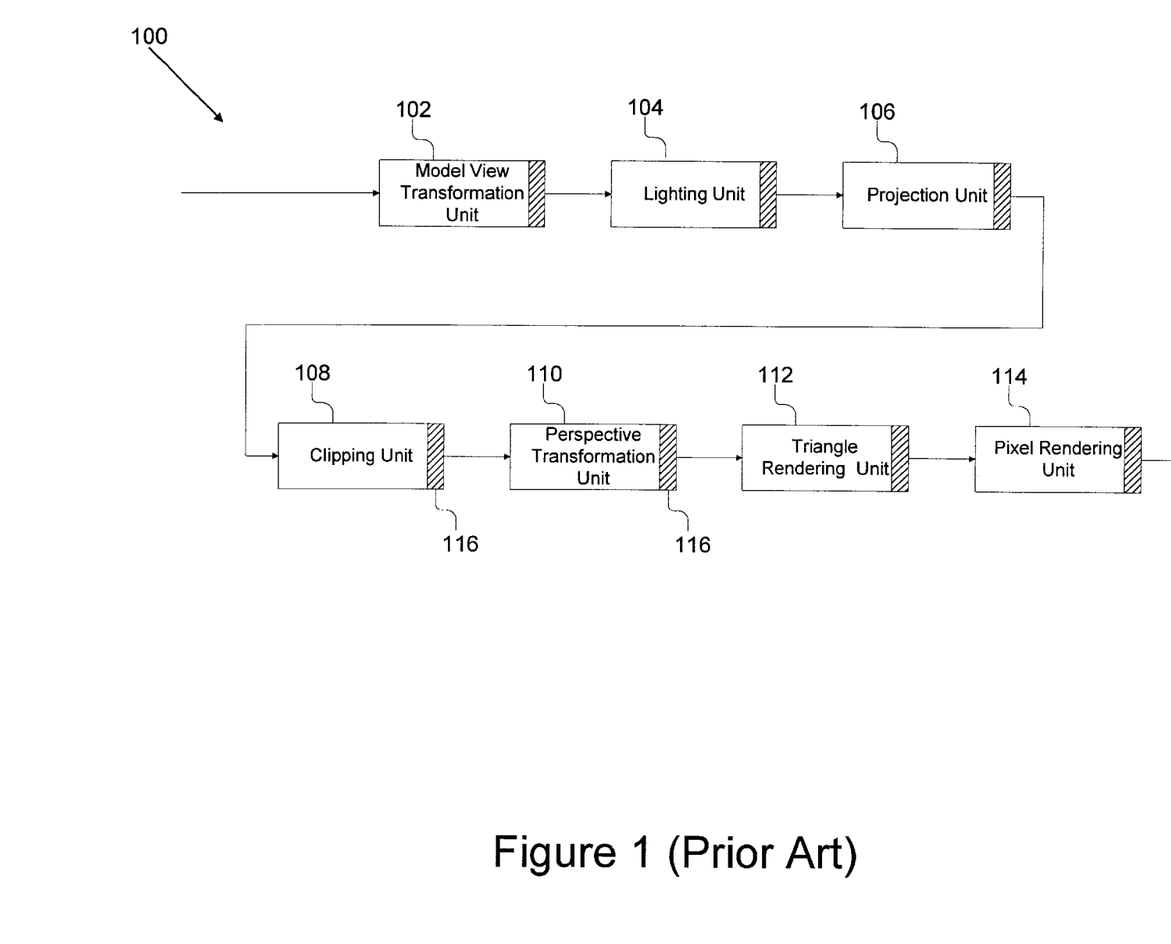
FIG. 1 is a block diagram of a geometry pipeline of the prior art.

Graphics processing for rendering three-dimensional objects includes a number of steps. By way of example, FIG. 1 shows a prior art pipeline for processing graphics computations required for rendering three-dimensional objects. This is generally referred to as a geometry pipeline in the art. The geometry pipeline preferably has a number of stages or units each of which performs a different type of processing. As shown in FIG. 1, a typical prior art geometry pipeline 100 includes: a model view transformation unit 102, a lighting unit 104, a projection unit 106, a clipping unit 108, a perspective transform unit 110, a triangle rendering unit 112, and a pixel rendering unit 114. Each of these units 102–114 performs conventional graphics operations such as disclosed by Foley, van Dam, et al in *Computer Graphics: Principles and Practice*, 1996. Exemplary prior art graphics controllers performing similar operations include the ViRGE graphics controller, manufactured and sold by S3 Incorporated of Santa Clara, Calif.

One particular problem with the prior art is the amount of storage required to perform these operations. Since each unit 102–114 in the geometry pipeline 100 may perform its operations at a different rate, and also because each unit 102–114 cannot begin processing until the previous unit 102–114 has completed its processing, the prior art is forced to include a series of buffers at the end of each unit 102–114. These buffers are shown with shading and denoted with reference numerals 116. However, these buffers are nearly always under utilized because in only the rarest of cases with every buffer for each unit 102–114 be filled. More commonly, buffers of one or two units 102–114 that are filled. However, the prior art requires these buffers that consume precious space storage space. Thus, the use of such buffers and the need to move data between the units 102–114 consumes a lot of bandwidth and resources. Therefore, there is a need for a system that is able to reduce the amount of storage space, and thereby reduce the amount of chip area required for graphics processing for rendering three-dimensional objects.

Yet another problem in the prior art is that while not all the data is needed for each stage of the pipeline, it must be moved to each successive stage and storage for the data is required at each successive stage. Therefore, the prior art unnecessarily moves data between stages that is not needed for operations in those stages. For example, even though color data and texture coordinates are not needed for the model view transformation, color data is provided to the prior art model view transformation unit. This is a particular problem when the data necessary for storing texture information is considered. Especially, for multi-texture environments, the problem of having to move and storing so much unused data can be a serious problem. Therefore, a system and method that can reduce the amount of data transferred in a geometry pipeline is needed.

Therefore, there is a need for systems and methods for organizing and managing the data used by a geometry pipeline in processing graphics data.

SUMMARY OF THE INVENTION

The present invention overcomes the deficiencies and limitations of the prior art with a token-based buffer system and method for a geometry pipeline in three-dimensional graphics. The token-based buffer system preferably comprises: a buffer control initialization (BCI) unit, a new token or index module, a geometry control pipeline, a vertex buffer, and a processing engine. The token-based buffer system provides a shared resource environment in which tokens are assigned for blocks of data. Each block of data includes that data necessary for each unit or stage in the geometry pipeline to perform its computation. The use of tokens is advantageous because it optimizes the storage efficiency for storing the blocks of data and ensures the correctness of the data as it is passed between stages.

The vertex buffer provides a storage area of predetermined sized for storing data. The vertex buffer preferably has a plurality of storage locations, each of the storage locations associated with a respective token. For each token there are a plurality of storage locations for storing different fields and data need for the different processing stages of the pipeline. The vertex buffer is preferably a shared resource that is used by different stages of the geometry pipeline and the processing engine. Thus, the present invention provides increased storage efficiency in storing the data used by the geometry pipeline.

The BCI unit is coupled to receive data and requests for processing. In response, the BCI unit stores data in the vertex buffer, secures a token for the data, and sends the token to the geometry control pipeline for the appropriate processing. The token provides an index or reference to the location in the vertex buffer where the data block has been stored. The token also has reference to empty fields where information from processing can be stored. The token or index module manages buffer capacity and provides a token to the next available portion in the vertex buffer, or if there is no additional capacity, indicates such. The token or index module is coupled to the BCI unit for getting the next available token, and to the geometry control pipeline for releasing a token for re-use after all processing for that token has been completed.

The geometry control pipeline is coupled to receive a token and processes the token through each stage of the geometry pipeline. The geometry control pipeline is also coupled to the vertex buffer and the processing engine. The geometry control pipeline is coupled to the vertex buffer to retrieve data and provide it to the processing engine. The geometry control pipeline is coupled to the processing engine to sent control signals to the processing engine to specify the operation that that the processing engine should perform with the data. One particularly advantageous feature of the present invention is that the token and geometry control pipeline allow the operations to be performed in parallel. For example, the geometry control pipeline permits the lighting transformation to be done in parallel with the projection transformation and the perspective transformation. Thus, the present invention provides a system that can reduce the amount of data that must be transferred in processing three-dimensional graphics objects. These and other features and advantages of the present invention may be better understood by considering the following detailed description of a preferred embodiment of the invention. In the course of this description, reference will frequently be made to the attached drawings.

DETAILED DESCRIPTION OF THE PREFERRED EMBODIMENTS

Figure 2:
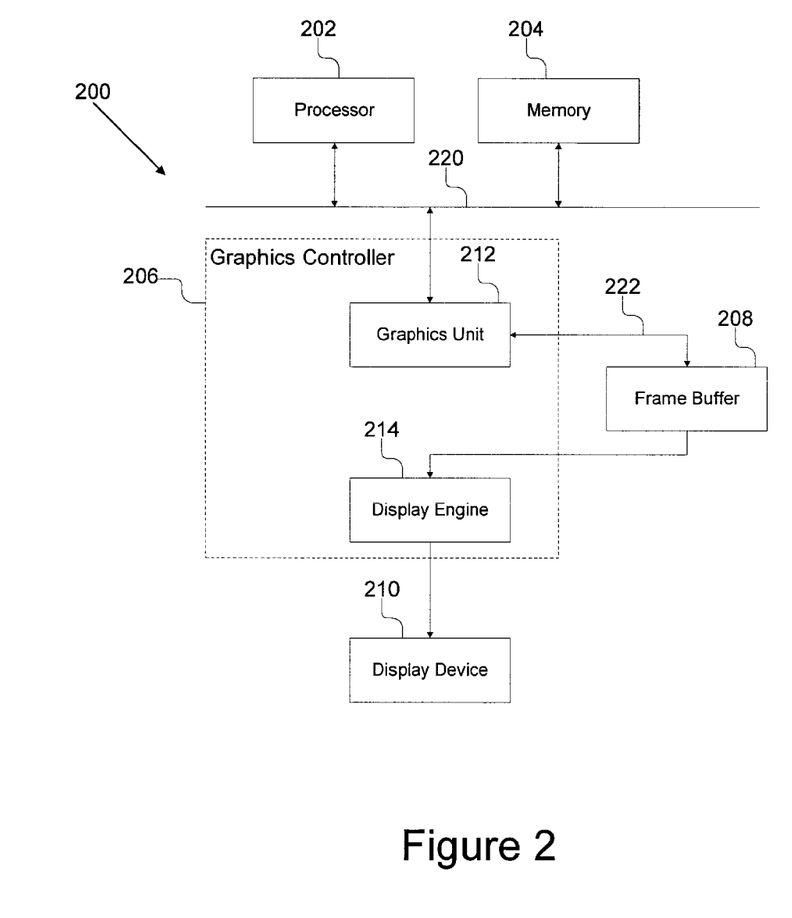
FIG. 2 is a block diagram of a computer system including the graphics system of the present invention.

In order to place the present invention in proper perspective, the general computer system 200 in which the invention operates will first be described. FIG. 2 shows a block diagram of a computer system 200 including the graphics system 206 of the present invention. The computer system 200 preferably comprises a central processing unit or processor 202 that connects with a memory 204 and a graphics controller 206 in a von Neuman type architecture via a bus 220 such as a personal or mini computer. The graphics controller 206 couples the bus 220 to the frame buffer 208 and a display device 210. The system 200 may include a data storage device, an input device and network interface (all not shown). The processor 202 is preferably a microprocessor such as Intel Pentium III or PowerPC; the output device 604 is preferably a video monitor; and the input device is preferably a keyboard and mouse-type controller. The memory 204 preferably includes random access memory (RAM) and read-only memory (ROM). The processor 602 operates under the control of the memory 204 to process the transactions and interaction as will be described in more detail below.

The graphics controller 206 includes a graphics unit 212 and a display engine 214. The graphics unit 212 is coupled to the system bus 220 for communication with the processor 202. The graphics unit 212 is coupled by line 222 to the frame buffer 208 for retrieving and storing data in the frame buffer 208. The graphics unit 212 processes graphic primitives received from the processor 202 and renders the primitives to the frame buffer 208. The graphics unit 212 includes a graphics engine (304 in FIG. 3) as will be described in more detail below in addition to a VGA engine (not shown) and an LPB engine for processing real-time video (not shown). For convenience and ease of understanding only the relevant portions of the graphics unit 212 will be described below focusing primarily on the graphics engine 304. The frame buffer 208 is also coupled to the display device 210 by the display engine 214 of the graphics controller 206. The display engine 214 is of a conventional type such as in ViRGE graphic controller chip manufactured and sold by S3 Incorporated, and includes a display FIFO, a streams processor, a RAMDAC, color look up table, and mask registers and other circuitry for converting the pixels output by the frame buffer 208 into an analog signals provided to the display device 210.

Figure 3:
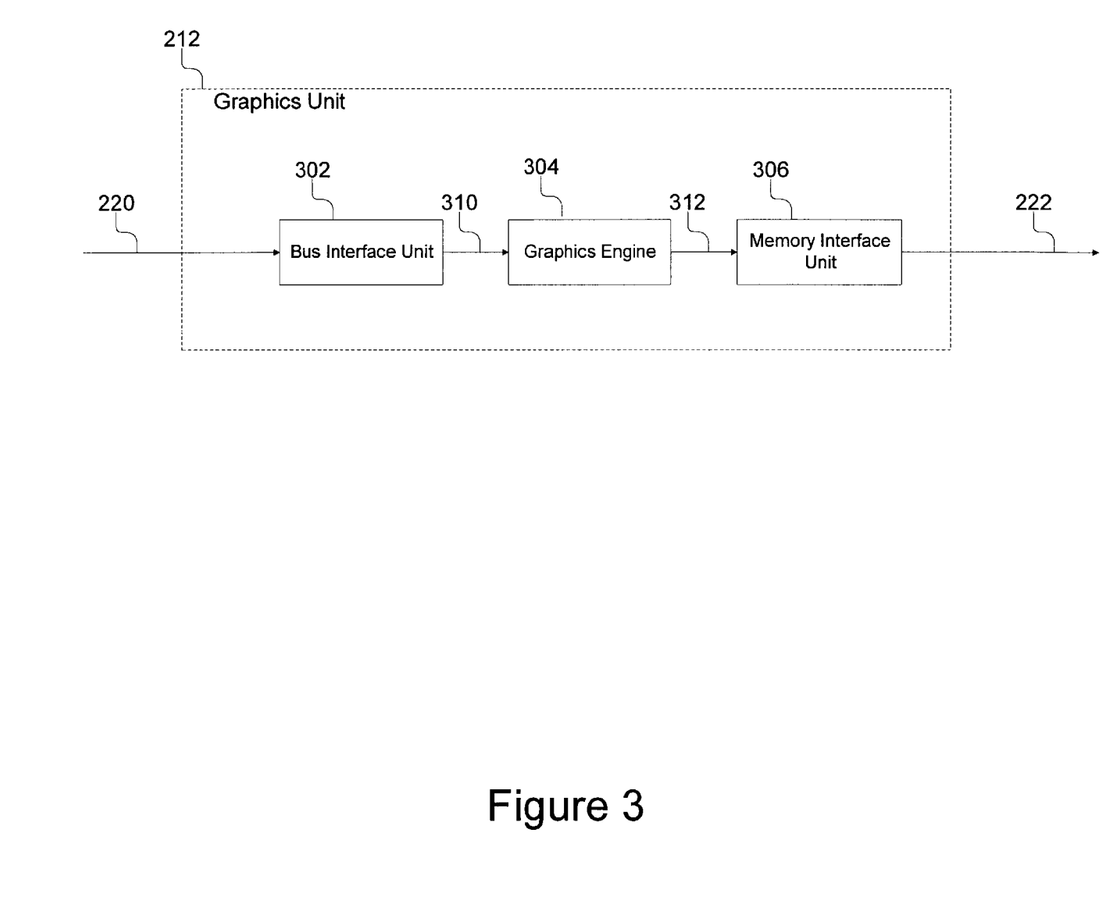
FIG. 3 is a block diagram of the graphics unit of the present invention.

Referring now to FIG. 3, the graphics unit 212 of the present invention is shown in more detail. The graphics unit 212 preferably comprises a bus interface unit 304, a graphics engine 304 and a memory interface unit 306. The bus interface unit 304 provides for communication over the system bus 220 consistent with the bus protocol in use. The bus interface unit 304 sends data to the processor 202 and receives data and commands from the processor 202 that in turn are provided as input to the graphic engine 304. Basically, the bus interface unit 304 enables the communication between the processor 202 with graphics engine 304. The bus interface unit 302 is of a conventional type as known to those skilled in the art and currently in use in other graphic controllers such as the one identified above. The output of the bus interface unit 302 is provided on line 310 to the graphics engine 304.

The graphics engine 304, as has been described above, processes graphic primitives and renders the primitives to the frame buffer 208 in the form of pixels. Different embodiments for the graphics engine 304 are described with particularity below with reference to FIGS. 4, 5A and 5B. The graphics engine 304 provides its output on line 312.

The memory interface unit 306 is of a conventional type and includes latches and other control logic for communicating with the frame buffer 208. The memory interface provides for the storage and retrieval of data from and to the frame buffer 208. Those skilled in the art will recognize that memory interface unit 306 may take a variety of forms depending on the type and size of devices use for the frame buffer 208.

Figure 4:
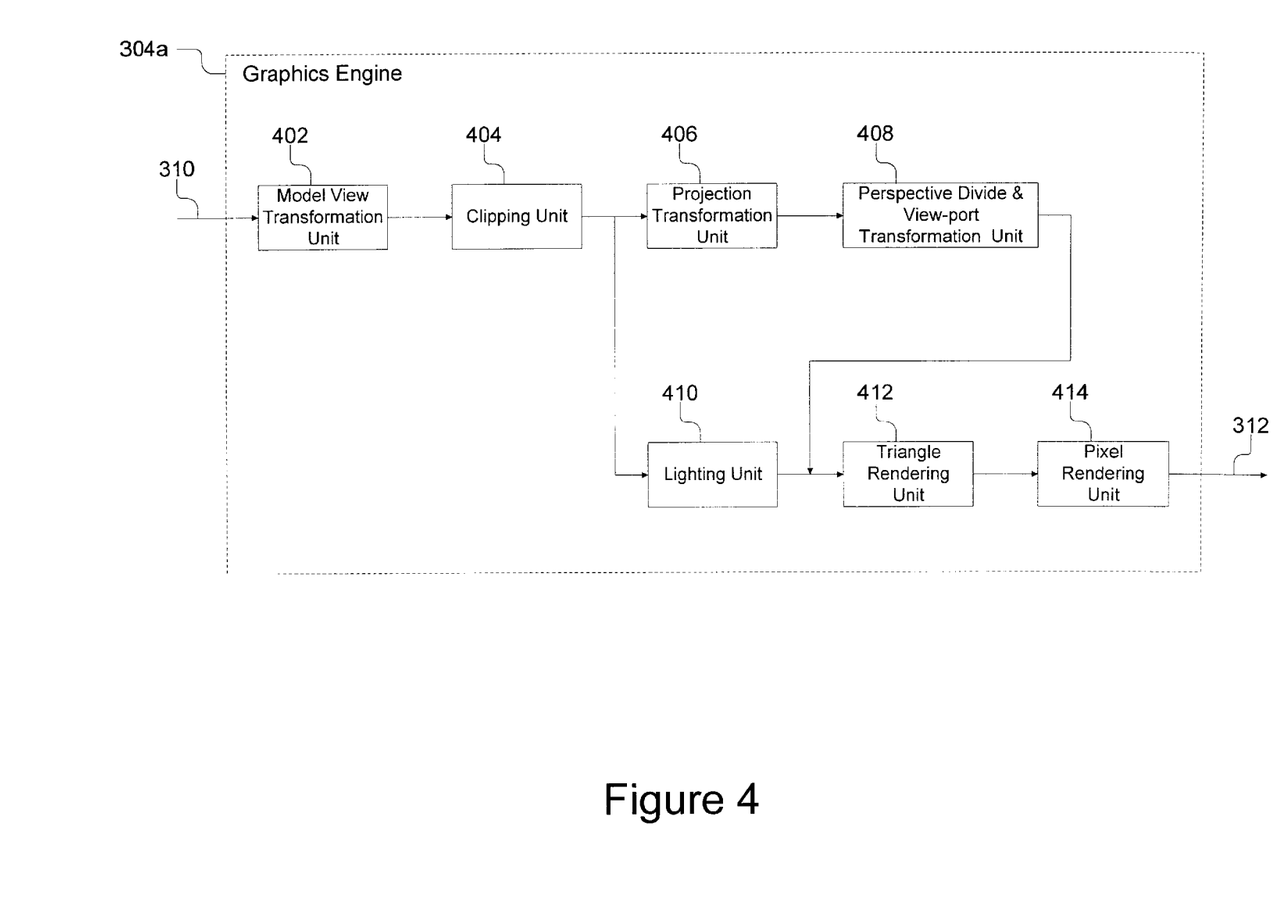
FIG. 4 is a high-level block diagram of a first embodiment of the graphics engine of the present invention.

Referring now to FIG. 4, the graphics engine 304 in accordance with the present invention is shown in more detail. FIG. 4 shows a high-level block diagram of a first embodiment of the graphics engine 304a of the present invention. In this embodiment, each of the units 402, 404, 406, 408, 410, 412 and 414 are assumed to be dedicated hardware units. The present invention provides a system in which rather than passing the data need for each unit 402, 404, 406, 408, 410, 412 and 414 to perform its operation, the system passes a token or index to the data. For description of the present invention these terms are used interchangeably and treated as the same. This is advantageous because it reduces the bandwidth and storage required for passing data from unit to unit. Yet another advantage of using tokens, is that it allows entry into the graphic engine 304 (or geometry sub-system) at any point before or after one of the units, in contrast to the prior art that permitted data to be input to the graphics engine only as input to the model view transformation unit. However, FIG. 4 is also provided to illustrate a second novel aspect of the present invention, namely, that because of the use of tokens, the present invention also allows different units or stages of the geometry pipeline to operate in parallel.

The first embodiment of the graphics engine 304 preferably includes a model view transformation unit 402, a clipping unit 404, a projection unit 406, a perspective transformation unit 408, a lighting unit 410, a triangle rendering unit 412 and a pixel rendering unit 414. The model view transformation unit 402, the clipping unit 404, the projection unit 406, the perspective transformation unit 408, the lighting unit 410, the triangle rendering unit 412 and the pixel rendering unit 414 each perform operations of a conventional nature as will be known to those skilled in the art. Such operations are described in Foley, van Dam, et al in *Computer Graphics: Principles and Practice*, 1996 at page 866 et. seq., and therefore, will not be fully discussed here. Each of the units 402, 404, 406, 408, 410, 412 and 414 will be discussed primarily with regard to its coupling provided by the use of tokens and differences from conventional method for performing theses operations.

In the preferred embodiment, the model view transformation unit 402 has an input coupled to line 310 to receive commands and data from the bus interface unit 304. The model view transformation unit 402 preferably receive graphics primitives in model or world space (Xo, Yo, Zo, Wo), and translates them into eye space (Xe, Ye, Ze, We). The output of the model view transformation unit 402 is preferably coupled to input of the clipping unit 404.

In the preferred embodiment, clipping is performed in two stages. The clipping unit 404 performs only Z (near or far) clipping and does so in eye space. The clipping unit 404 performs clipping using any one of the conventional algorithms. The new vertex parameters are preferably interpolated in the case of clipping and new triangles are generated as in the traditional clipping algorithms. The output of the clipping unit 404 is provided to both the projection unit 406 and the lighting unit 410. Because of the use of tokens, the same token is sent to the projection unit 406 and the lighting unit 410, even though each unit 406, 410 uses a different portion of the data structure referenced by the token. The eye space vertex coordinates from the clipping unit 404 are provided to and used by the lighting unit 410, while the entire vertex and data structure are provided to the projection unit 406 for additional processing.

The projection unit 406 is coupled to the output of the clipping unit 404. The projection unit 406 performs a projective transform on the vertices to convert them from eye space (Xe, Ye, Ze, We) to clip space (Xc, Yc, Zc, Wc). This is performed in a conventional manner. The output of the projection unit 406 is provided to the perspective transformation unit 408.

The perspective transformation unit 408 receives the token and performs a perspective divide and view-port transform on the vertex reference by the token. The perspective transformation unit 408 preferably operates in a conventional manner on the vertex data consistent with traditional algorithms. The perspective transformation unit 408 converts the vertex from clip space (Xc, Yc, Zc, Wc) to screen space (Xs, Ys, Zs, Ws). The output of the perspective transformation unit 408 is coupled to the triangle rendering unit 412.

As noted above, the lighting unit 410 preferably operates in parallel with the projection unit 406 and the perspective transformation unit 408. The present invention is particularly advantageous because this allows the present invention to reduce the latency in the geometry pipeline compared to the prior art. The lighting unit 410 provides shading using any one of the conventional algorithms such as Gouraud or Phong. Although not shown in FIG. 4, the lighting unit 410 includes its own normal matrix transformation unit that will transform the vertex normal from either model or world space to the eye space where the lighting computation is performed. In an alternate embodiment, the lighting unit 410 can be by passed or supplied with vertex color which can then be added to the computed color. The output of the lighting unit 410 is provided to the triangle rendering unit 412.

The triangle rendering unit 412 receives input from both the lighting unit 410 and the perspective transformation unit 408. The lighting unit 410 provides the vertex color and the perspective transformation unit 408 provides the view coordinates. The triangle rendering unit 412 performs the x and y clipping. It was noted above that clipping was divided into two steps. This is the second of those steps. The x and y clipping is preferably performed in screen space and is part of the rasterization process. The output of the triangle rendering unit 412 is provided to the pixel rendering unit 414. The pixel rendering unit 414 generates the pixels from the primitive data from the triangle rendering unit 412 and stores the data in the frame buffer 208.

The present invention is particularly advantageous because each unit 402, 404, 406, 408, 410, 412 and 414 provides an entry point to the graphics engine 304a or geometry pipeline. In other words, each block in the graphics engine 340a represents a possible entry point for processing. For example, the processor 202 may perform the model view transformation and provide the data in eye space directly as input to the clipping unit 404. From that point on the graphics engine 304a would process the data through to storage in the frame buffer 208. Thus, at any point before one of the different units 402, 404, 406, 408, 410, 412 and 414, the graphics driver or software could load balance between the processor 202 and the graphics controller 206. This is particularly advantageous because it allows the graphics unit 212 to load balance with the processor 202 depending on the processing being done by each.

Figure 5A:
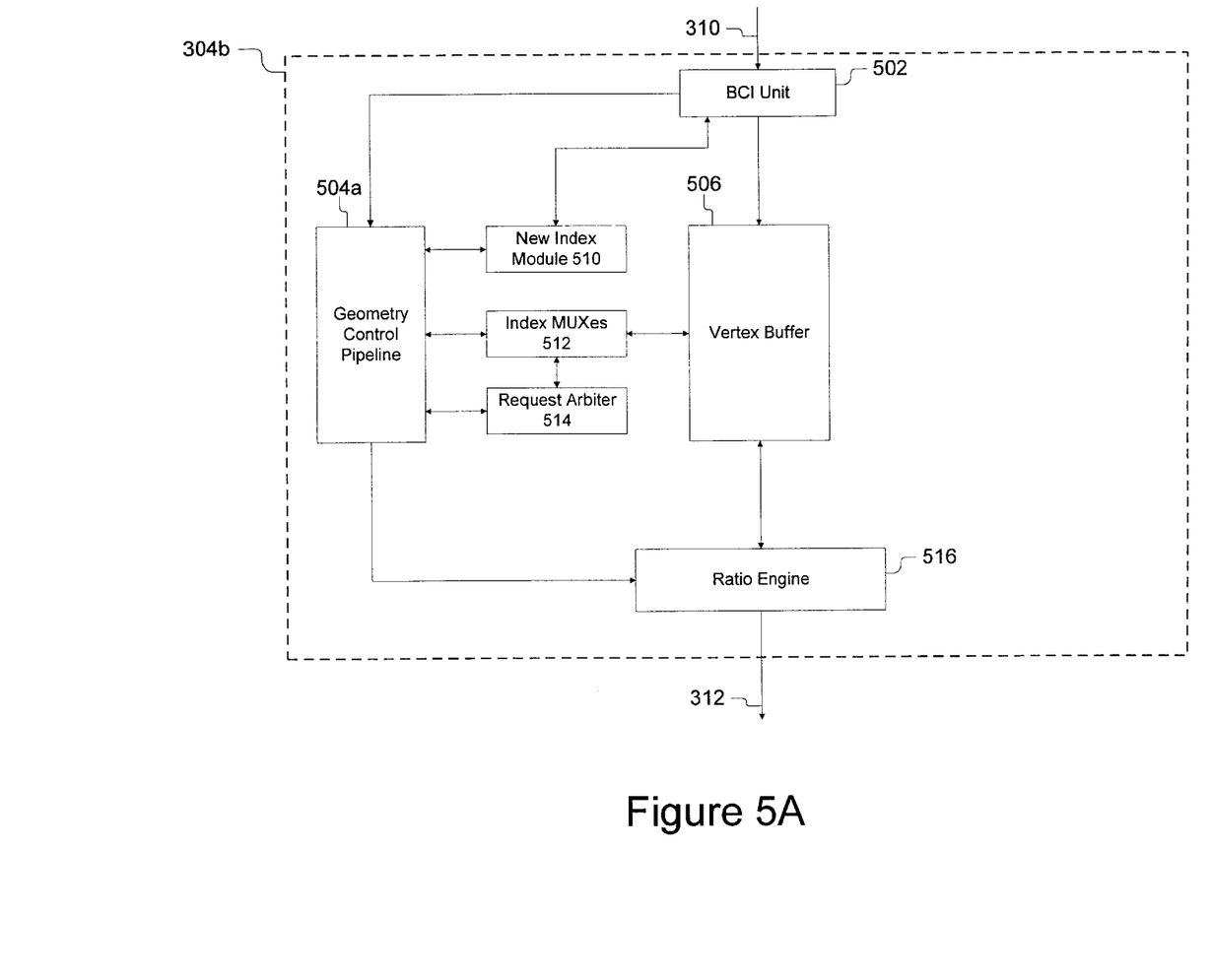
FIG. 5A is a block diagram of a second and preferred embodiment of the graphics engine of the present invention.

FIG. 5A illustrates a block diagram of a second and preferred embodiment of the graphics engine 304b of the present invention. FIG. 5A shows the preferred embodiment of the present invention from a hardware perspective. The operation of this hardware will be described below with reference to FIG. 6A. Therefore, we will focus here on the function performed by each component and the coupling of each component to other components in FIG. 5A. The second embodiment of the graphics engine 304b preferably comprises: a buffer control initialization (BCI) unit 502, a geometry control pipeline 504a, a vertex buffer 506, a new index module 510, a set of index multiplexers 512, a request arbiter 514 and a ratio engine 516.

The buffer control initialization (BCI) unit 502 is coupled to line 310 to receive input from the bus interface unit 302.

The BCI unit 502 is responsible for assigning incoming vertex data a token and initializing the processing of the vertex data. The BCI unit 502 is also responsible for controlling the storage of the data in the vertex buffer 506. The present invention advantageously used the index address to the vertex buffer 506 as the token. Thus, the BCI unit 502 is coupled to the vertex buffer 506 to provide data and control signals. The BCI unit 502 initiates the processing of a token by the geometry control pipeline 504*a*, by passing the token along with a command to the geometry control pipeline 504*a*. In this manner, the BCI unit 502 can have the geometry control pipeline 504*a* begin processing the token at any one of the units identified and described with reference to FIG. 4. The BCI unit 502 is coupled to the geometry control pipeline 504*a*, for this purpose. The BCI unit 502 is also coupled to the new index module 510 to determine the next available index or token, if there is one.

The geometry control pipeline 504*a* controls the transfer of data from the vertex buffer 506 to the ratio engine 516, and vice versa. The geometry control pipeline 504*a* is coupled to the address inputs of the vertex buffer 506 by index multiplexers 512 so that the data desired will be output by the vertex buffer 506. The index multiplexers 512 are also controlled in part by the request arbiter 514 as will be described below. Because of the above coupling, the geometry control pipeline 504*a* can apply a given token to the vertex buffer 506 via the index multiplexers 512. This will result in the vertex data corresponding to the token to be output by the vertex buffer 506 and applied to the inputs of the ratio engine 516. The geometry control pipeline 504*a* also controls the operation that will be performed by the ratio engine 516. In particular, the geometry control pipeline 504*a* has its control outputs coupled to the ratio engine 516. This allows the geometry control pipeline 504*a* to controls the ratio engine 516 such that it is configured to perform the calculation or operation desired. The geometry control pipeline 504*a* is also coupled to the new index module 510 to receive a new token or index assigned to data in conjunction with the BCI unit 502.

Figure 8:
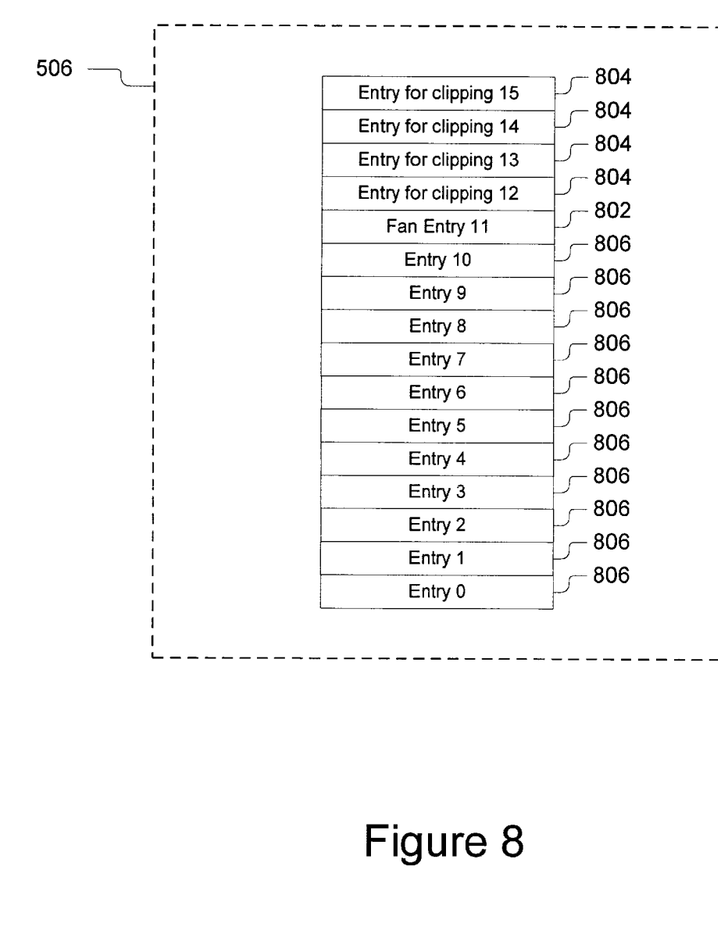
FIG. 8 is a diagram showing a preferred embodiment for a vertex buffer of the present invention.

The vertex buffer 506 is preferably a storage area having predefined fields for storing vertex data. In an exemplary embodiment, the vertex buffer 506 is a 64×128 1R1W Megacell, although it could be any type of memory device. For example, each entry has the format NxNyNzCdCs of 127 bits where the NxNyNz format is 1.8.12 and Cd and Cs are each 32 bits. In such an embodiment, each vertex will require four locations, and therefore, the vertex buffer 506 would be capable of holding 16 vertices. However, those skilled in the art will realize that the vertex buffer 506 may have any of various sizes in terms of bit width as well as number of entries. Referring also now to FIG. 8, the exemplary embodiment of the vertex buffer 506 will be described. In the preferred embodiment, the vertex buffer 506 has a first group of entries reserved for difficult computational cases, a second group of entries reserved for storage of newly generated clipping vertices, and a third group of entries that are freely allocable and usable by any of the different stages. In the exemplary embodiment, the vertex buffer 506 has 16 entries. Of the sixteen entries one is preferably reserved to for a fan starting vertex. One entry (entry 11) is reserved for this case since it is particularly difficult to handle separately. Four additional entries (entries 12–15) are reserved as insertion entries for triangle vertices that may need to be added during a clipping operation. The use of these dedicated insertion entries will be described below with reference to the clipping operation and FIGS. 6A and 6B.

The new index module 510 is responsible for tracking tokens. Since the vertex buffer 506 is of limited size, only a predetermined number of tokens may exist at a given instant. The new index module 510 tracks how many tokens are available and provides the next available token upon request. In an exemplary embodiment, the new index module 510 is a pair of counters. The counters may be thought of as the read and write pointers to a FIFO. Upon reset, the read counter is set to zero and the write counter is set to n, where n is the number of tokens or entries provided by the vertex buffer 506. In the example vertex buffer 506 described above n would equal 10. The range of the counter is from 0 to 10 since only eleven entries of the vertex buffer 506 are allocated for vertices. Five entries of the vertex buffer 506 are reserved, one (entry 11) for the fan starting vertex and the other four (12, 13 and 14, 15 in a double buffered manner) for the extra vertices generated from clipping. The communication between the BCI unit 502 and the new index module 510 is the same as interfacing with a FIFO. The read counter is read s the new index, and is advanced by one when a new token is allocated. The write counter would be advanced by one when a token is released by the triangle rendering unit (see discussion below) after the processing associated with that token is complete. Those skilled in the art will recognize that the counters must be advanced properly to ensure operation because of the wrap around condition when both counters reach 10. Furthermore, the present invention advantageously uses the same constraints on the counter whether the token represents a line or a triangle, thereby making the hardware architecture unified and simple.

The request arbiter 514 is also coupled to the geometry control pipeline 504*a* and the index multiplexers. If there is a conflict between use by a particular stage in the geometry control pipeline 504*a* of a particular index or token, this conflict is resolved by the request arbiter 514. The request arbiter 514 preferably does so on a priority basis. The first stage in the geometry control pipeline 504*a* is provided with the highest priority by the request arbiter 514. The next stage is provided by the next highest priority, and so complete as soon as possible and that there will be no points where the pipeline stalls. Since the first stage in the geometry control pipeline 504*a* must be completed before the others, and so on, this will ensure that each stage will get the vertices in an orderly manner.

Finally, the ratio engine 516 is provided to perform the calculations specified by the geometry control pipeline 504*a* with data from the vertex buffer 506. The ratio engine 516 is preferably an arithmetic logic unit adapted for the processing that must be performed by a geometry pipeline 504*a*. On such exemplary embodiment for a ratio engine 516 is disclosed in commonly assigned, co-pending U.S. patent application Ser. No. 09/371,972, filed Aug. 10, 1999, entitled "System And Method For Rasterizing Primitives Using Direct Interpolation" by Konstantine Iourcha, et. al which is incorporated herein by reference. Yet another exemplary embodiment for the ratio engine 516 is disclosed in commonly assigned, co-pending U.S. patent application Ser. No. 09/418,673 filed Oct. 14, 1999, entitled "Direct Evaluation Of Multi-Pixel Multi-Texture Rendering" by Dong-Ying Kuo and Michael Hong which is incorporated herein by reference. It should be understood that the ratio engine 516 and the vertex buffer 506 are coupled so that the ratio engine 516 can not only receive data from the vertex buffer 506, but also store output data back to the vertex buffer 506.

Figure 5B:
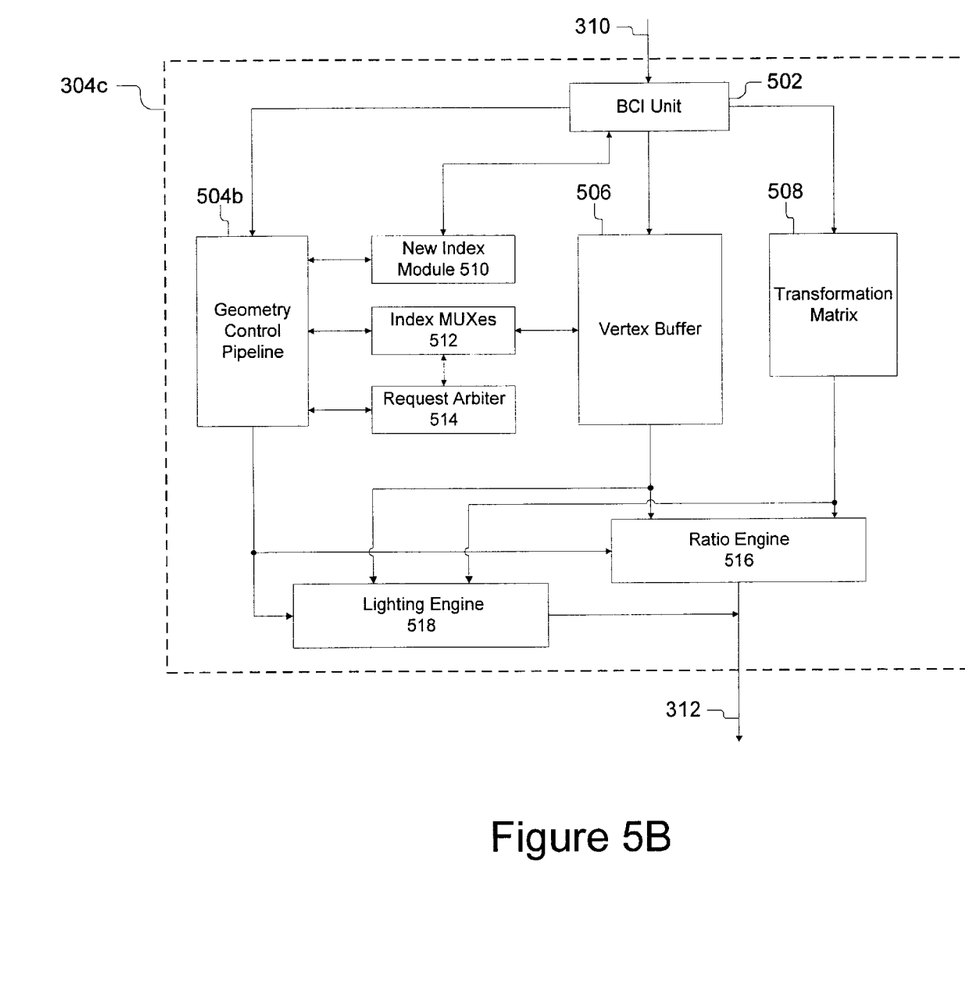
FIG. 5B is a block diagram of a third embodiment of the graphics engine of the present invention.

FIG. 5B is a block diagram of a third embodiment of the graphics engine 304*c* of the present invention. This embodiment of the graphics engine 304*c* is similar to the second embodiment of the graphics engine 304b. Where appropriate like reference numerals have bee used for like parts that have similar or identical functionality. In addition to components described above with reference to FIG. 5A, the third embodiment of the graphics engine 304c further comprises a transformation matrix 508 and a lighting engine 518.

The transformation matrix 508 is used to provide data used by different stages in the geometry pipeline 504b. As noted above may of the various stages perform transformations between different spaces. The transformation matrix 508 stores the matrices need to perform those transformations. For example, the transformation matrix 508 may includes two 4×4 matrices and a 5-parameter matrix. The transformation matrix 508 is coupled to the BCI unit 502 to receive the matrices upon initialization. The transformation matrix 508 also has an output coupled to both the ration engine 516 and the lighting engine 518 to provide the matrix data for various computations. Those skilled in the art will recognize that the matrix information is required even for the second embodiment of the graphics engine 304b, however, it is assumed stored as part of the geometry control pipeline 504a as shown in FIG. 6A (but not shown in FIG. 5A).

The lighting engine 518 is provided in the third embodiment of the graphics engine 304c. The third embodiment of the graphics engine 304c provide an architecture that is truly parallel with regard to the processing of lighting, projection and perspective. The lighting engine 518 is coupled to the geometry control pipeline 504b to receive control signals, the vertex buffer 506 to receive data and the transformation matrix to receive matrices. The output of the lighting engine 518 is coupled similar to the ratio engine 516 for either output or storage back in the vertex buffer 506. The lighting engine 518 is preferably an arithmetic logic unit adapted to perform the calculation for lighting such as various types of illumination, shading and transformations. By adding a separate lighting engine and latches inherent in the engine, the same token can be used to get the data out of the vertex buffer 506 at the same time and process it by the two separate engines 516, 518.

Figure 6A:
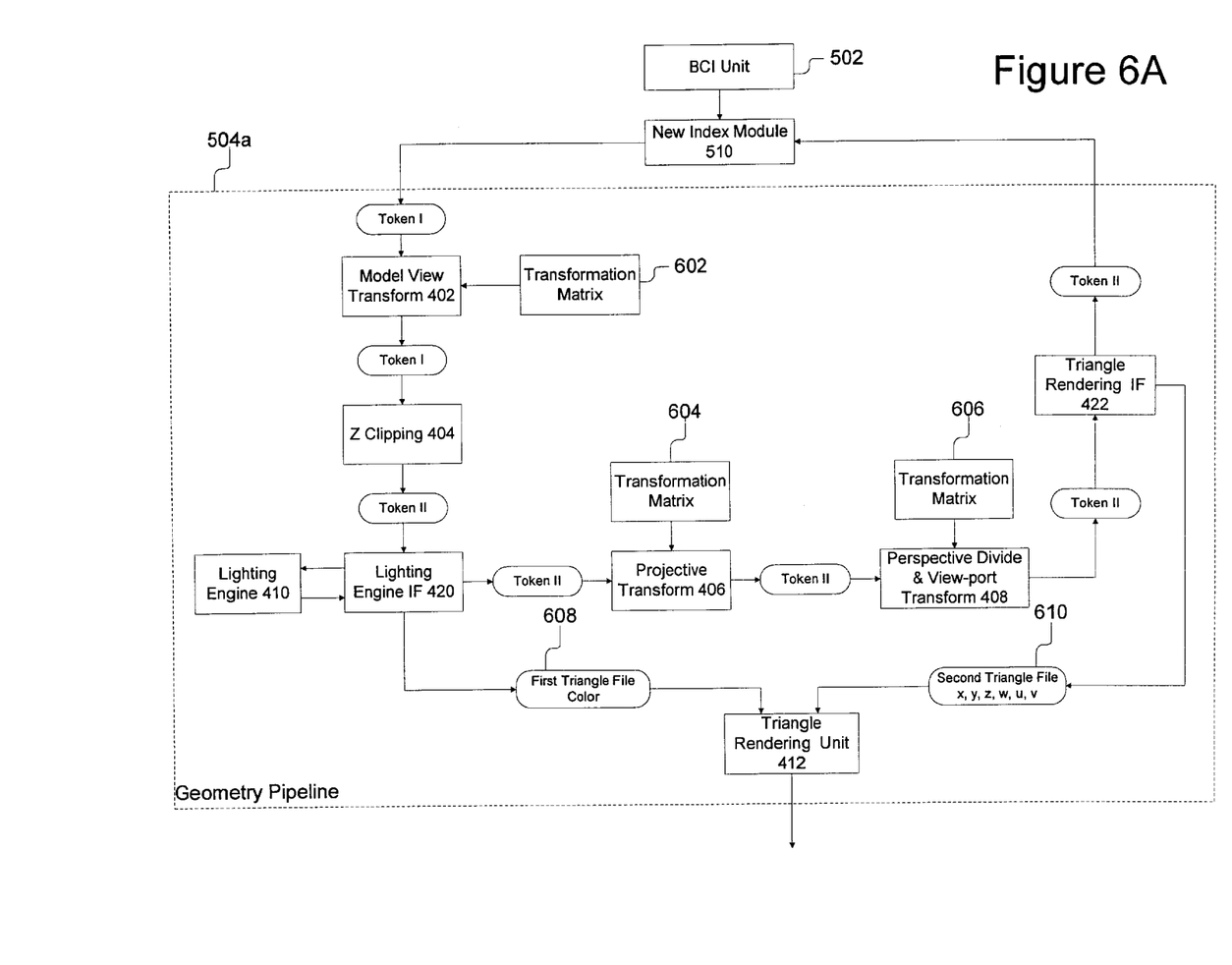
FIG. 6A is a block diagram showing the processing of tokens according to second and preferred embodiment of the graphics engine, and the units that the ratio engine can be configured as under direction of the geometry pipeline.
Figure 6B:
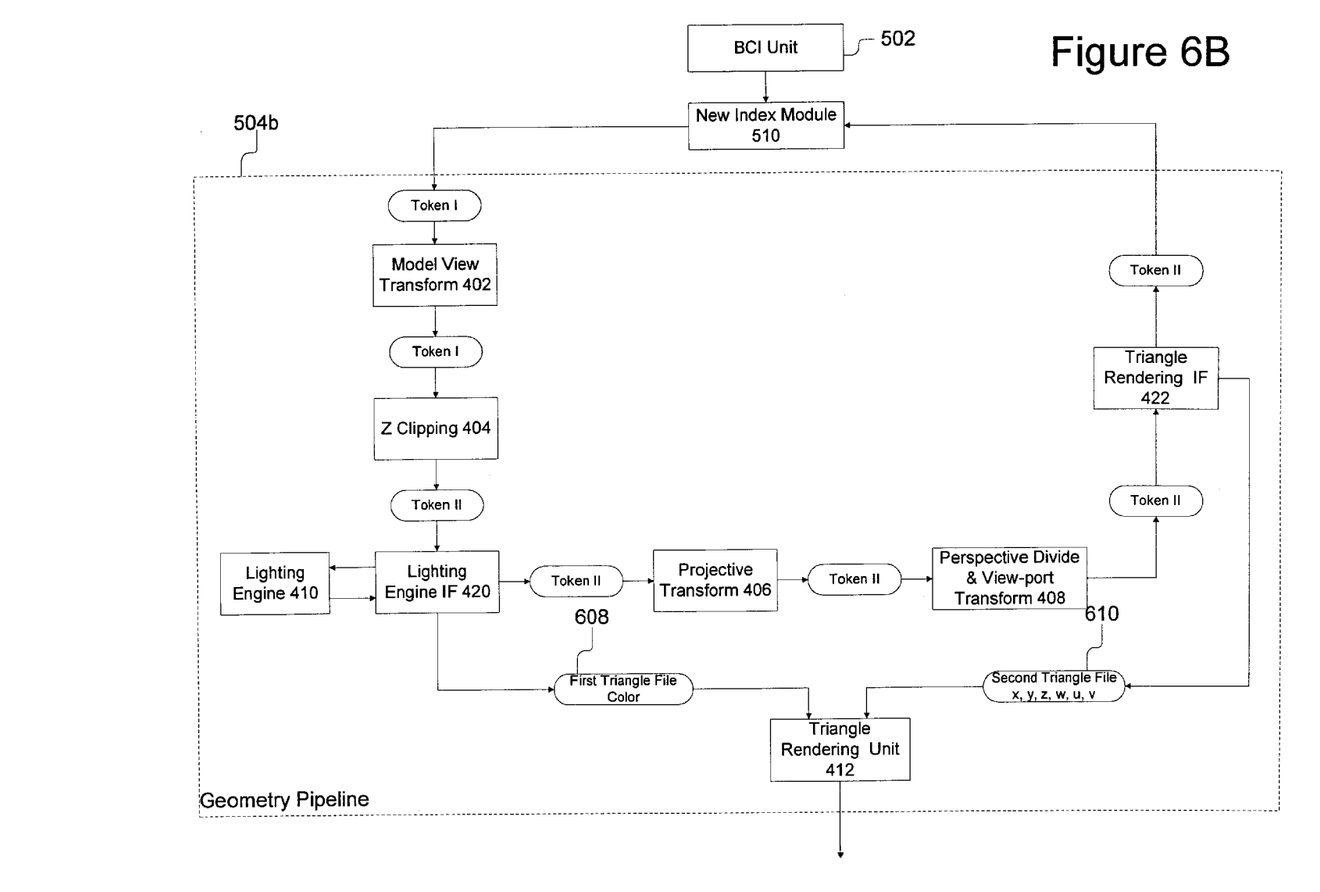
FIG. 6B is a block diagram showing the processing of tokens according to third embodiment of the graphics engine, and the units that the ratio engine can be configured as under direction of the geometry pipeline.

Referring now to FIG. 6A, the diagram shows the processing of tokens according to second and preferred embodiment of the graphics engine 304b, and the units 402, 404, 406, 408, 410, 412 and 414 that the ratio engine 516 can be configured as under direction of the geometry control pipeline 504a. FIG. 6A shows in diagram form the life cycle of a token before it is re-used. In FIGS. 6A and 6aB, the token is shown in the diagram to illustrate how the token is passed between each stage of the geometry control pipeline 504a.

The process begins with the BCI unit 502. The BCI unit 502 is responsible for getting the token from the new index module 510. The BCI unit 502 forms a triangle from a strip, fan, triangle list or quad list. Providing the token in proper format is part of the triangle forming process. The BCI unit 502 receives data and then formats it according to one of two types of data structures, tokens or tags provided by the present invention. Even though both types of tokens provide for three indices only two are used for lines while three are used for triangles.

Figure 7A:
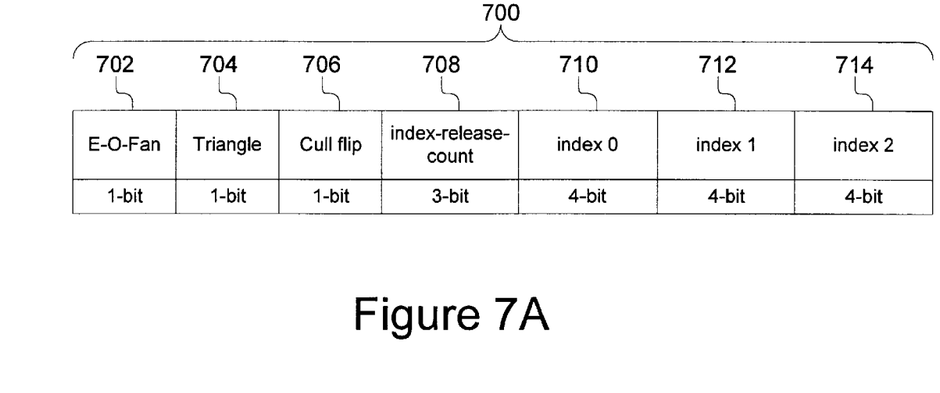
FIG. 7A is a diagram showing a first embodiment for a data block in the vertex buffer of the present invention.
Figure 7B:
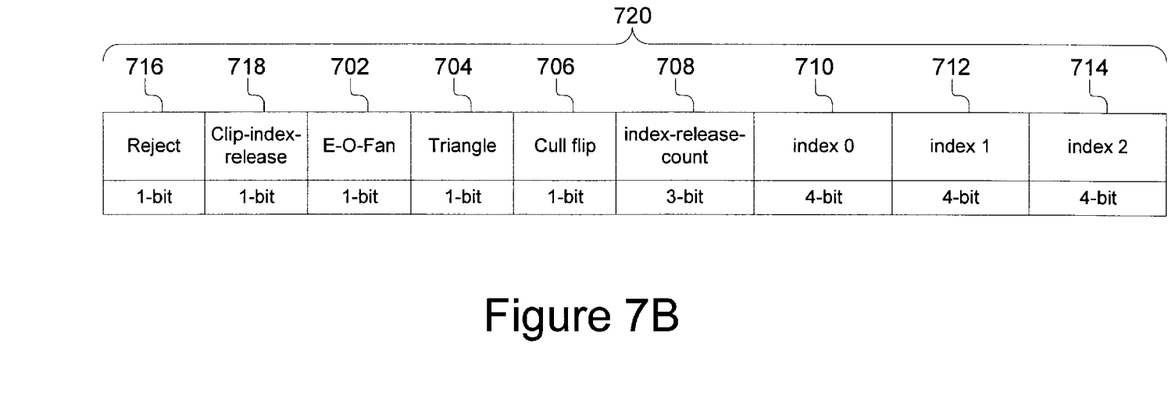
FIG. 7B is a diagram showing a second embodiment for the data block in the vertex buffer of the present invention.

Referring now also to FIGS. 7A and 7B, the preferred embodiments for the two types of tokens are shown. The vertex buffer 506 utilization is managed using a triangle token passing scheme. One type of token, token-I, is used before the clipping stage and the other type of token, token-II is used after the clipping stage. FIG. 7A illustrates the token-I. Token-I includes a plurality of different fields, each field being represented by one or more bits. The Token-I 700 includes an E-O-Fan field 702, a triangle field 704, a cull flip field 706, a index-release-count field 708, an index0 field 710, an index1 field 712, and an index2 field 714. Each of these fields are defined as follows: The E-O-Fan field 702 stores a flag used to release the fan slot of the vertex buffer 506. This is sent down by the BCI. The triangle field 704 is used to distinguish a vertex from a triangle. A "1" indicates that the index0 field 710, index1 field 712, and index2 field 714 form a triangle, and a "0" indicates that the index2 field 714 stores a vertex. The cull flip field 706 is used to indicate whether or not the triangle is of the same ("0") or different ("1") orientation as the first triangle in a strip or fan. The index-release-count field 708 is used to advance the write counter in the new index module 510 after exiting the triangle rendering unit 412. For a strip or fan, this field stores 1, for a triangle list it stores 3. The index0 field 710, index1 field 712, and index2 field 714 are pointers to the locations in the vertex buffer 506 where the vertex data is stored.

Token-II as shown in FIG. 7B has many of the same fields as the first type of token, token-I, however, it also includes the reject field 716 and the clip-index-release field 718. The reject field 716 is used to indicate that at triangle has been rejected or is outside the boundary of the viewable space. The clip-index-release field 718 is a flag used to release the double-buffered clipped indices. The clipping unit 404 decides which buffer to use. After existing the triangle rendering unit 412, the flag is used to signal the release of the indices pair.

Referring back to FIG. 6A, once the BCI unit 502 has formed a token, it attempts to store the data associated with that token in the vertex buffer 506. Before writing into the vertex buffer 506, the BCI unit 502 checks the availability of the new index and any returning data from the ratio engine 516. Since the ratio engine 516 may store data back to an index for use by later stages, the BCI unit 502 must make sure that both a new index is available and no data is returned from the ratio engine 516. If this is the case, then the BCI unit 502 stores the data in the vertex buffer 506, otherwise the BCI unit 502 must wait. Each token or index from the new index module 510 will circulate through the geometry stages and the be released. Thus, the token automatically coordinates the resource utilization among the different stages of the geometry pipeline 504a.

Once a token has been created, it is passed from the BCI unit 502 and the new index module 510 to the model view transform 402 of the geometry control pipeline 504a. It should be noted that the token at this point is preferably a token-I type. Furthermore, it should be understood that the model view transform 402 includes an associated transformation matrix 602 that stores data used by the ratio engine 516 to perform the model view transform 402. The model view transformation 402 preferably 9 receives graphics primitives in model or world space (Xo, Yo, Zo, Wo), and translates them into eye space (Xe, Ye, Ze, We). The model view transform 402 receives the token. Then the model view transform 402 checks the vertex buffer 506 for the availability of the indices identified in the token. If the data is available, the model view transform 402 performs its operation by configuring the vertex buffer 506 to provide data and the ratio engine 516 to perform the desired operation on the data. The output data from the ratio engine 516 is then stored in the locations specified by the token. The token is then passed to the next stage, in particular to the Z clipping stage 404.

The Z clipping stage 404 of the geometry control pipeline 504a first receives the token. Then the Z clipping stage 404 checks the vertex buffer 506 for the availability of the indices identified in the token. If the data is available, the Z clipping stage 404 performs its operation by configuring the vertex buffer 506 to provide data and the ratio engine 516 to perform the desired operation on the data. The output data from the ratio engine 516 is then stored in the locations specified by the token. The token is also converted to a type II token if reserved clipping entries are used. It should be noted that while the input to the Z clipping stage 404 is a Token-I type, the output of the token is a Token-II type. Since the Z clipping stage 404, can utilize the additional reserved entries in the vertex buffers, the Z clipping stage 404 passes on a Token-II type to account for use and release of the insertion entries 804. Also, the Z clipping stage 404 is the one stage that performs operations in triangle mode. The other stages perform their processing in vertex mode. Up to two new vertices may be generated by the Z clipping stage 404. To avoid complexity, the present invention only performs Z-near or Z-far clipping. If a triangle strides across the Z-near and the Z-far planes, then only the Z-near clipping is performed. The Z-far clipping is then performed during the pixel z-comparison. This stage 404 can also be disabled. If no clipping or clipping is disabled the token is passed through this stage 404. The Z clipping stage 404 generates new vertex parameters by interpolating in the case of clipping and new triangles using the traditional clipping algorithms. The clipping stage 404 also utilized the insertion entries for clipping 804 as necessary. The diagrams shown in Appendix A list the cases of the generation of extra triangles by the Z clipping stage 404 in which Zn denotes Z-near; and Zf denotes Z-far. For the cases of trivial-accept and trivial-reject, not clipping is necessary and the indices are passed directly to the next stage. Those skilled in the art will recognize that the Z clipping stage 404 must keep track of the clock-wise/counter-clock-wise orientation of the extra triangle such that the culling would be consistent at the culling stage. One bit of information is associated with each triangle to identify the orientation of the triangle and is stored in the field 706 of the token. Once the Z clipping operation.

The token is then passed to the lighting interface 420 to initiate parallel processing. More specifically, the token is passed from the Z clipping stage 404 to the lighting interface 420. The lighting interface 402 preferably includes buffers and other control logic for (1) sending data to and receiving data from the lighting engine 410, and for (2) generating a triangle file and providing it to the triangle rendering unit 412. The lighting interface 420 first receives the token. The lighting interface 420 then checks the vertex buffer 506 for the availability of the indices identified in the token. If the data is available, the data is transferred from the vertex buffer 506 to the lighting interface 420. The lighting interface 420 preferably retrieves the vertex normal, texture coordinates and color information from the vertex buffer 506 for use by the lighting engine 410. Once this data is retrieved from the vertex buffer 506, and stored in the lighting interface 420, the token is passed on to the token is then passed to the projective transform 406. It should be understood that the ratio engine 516 can be configured in this embodiment to perform the operation of the lighting engine 410. The present invention is advantageous because while the lighting engine 410 is processing data provided by the vertex buffer 506 and stored at the lighting interface 420, additional processing of the token in parallel by the projective transform 406 may be performed. Thus, the processing in the geometry pipeline 504 a continues and is not delayed by light processing. Once the lighting engine 410 has performed its operations on the data, the color data is returned to the lighting interface 420. The lighting interface 420 then creates a triangle file 608 and stores the color data in the first triangle file 608. The lighting interface 420 also provides the first triangle file 608 as input to the triangle rendering unit 412.

As noted above, the projective transform 406 receives the token from the lighting interface 420, and can process the token while the lighting engine 410 is performing its calculations. The token is first provided to the projective transform 406 and then to the perspective divide and view-port transform 408. The projective transform 406 and the perspective divide and view-port transform 408 are separate stages but operate in a similar manner. Each stage 406, 408 receives the token. Then each stage 406, 408 checks the vertex buffer 506 for the availability of the indices identified in the token. If the data is available, the each stage 406, 408 performs its operation by configuring the vertex buffer 506 to provide data and the ratio engine 516 to perform the desired operation on the data. The output data from the ratio engine 516 is then stored in at the locations specified by the token. The token is then passed to the next stage. Those skilled in the art will recognize that in FIG. 6A, a respective transformation matrix 604, 606 is provide for the projective transform 406 and the perspective divide and view-port transform 408. These transformation matrices 604, 606 include the data need to translate the vertices to the appropriate coordinate space. These transformation matrices 602, 604, 606 since they are not provided in a centralized manner as part of the hardware organization of FIG. 5A.

After the perspective divide and view-port transform 408, the token is sent to the triangle rendering interface 422. The triangle rendering interface 422 receives the token and then checks the vertex buffer 506 for the availability of the indices identified in the token. If the data is available, the data is transferred from the vertex buffer 506 to the triangle rendering interface 422. The triangle rendering interface 422 preferably retrieves the coordinate data (x, y, z, w, u, v) information from the vertex buffer 506 and stores the data in a second triangle file 610. The triangle rendering interface 422 provides the second triangle file 610 as input to the triangle rendering unit 412. Once this data is retrieved from the vertex buffer 506, and stored in the second triangle file 610, the token is passed back to the new index module 510 and released. This preferably accomplished through communication between the triangle rendering interface 422 and the new index module 510. The token is released by incrementing the write counter in response to signals from the triangle rendering interface 422.

Once the triangle rendering unit 412 has received both the first triangle file 608 and the second triangle file 610, the triangle rendering unit 412 processes these files 608, 610 to perform x and y clipping, and other operations. The triangle rendering unit 412 produces an output that can then be used by the pixel rendering unit 414 to generate the pixels stored in the frame buffer 208.

Referring now to FIG. 6B, a block diagram shows the processing of tokens according to third embodiment of the graphics engine 304c, and the units that the ratio engine can be configured as under direction of the geometry pipeline 304b. The blocks of this second embodiment are similar to those just described above with reference to FIG. 6A. For ease of understanding and convenience, like reference numerals have been used for like parts. The second embodiment of the geometry pipeline 304b corresponds to the hardware shown and described with reference to FIG. 5B. The second embodiment of the geometry pipeline 304b is different in the following respects. First, since this embodiment provides a centralized transformation matrix 508, there are not corresponding matrices shown in FIG. 6B, but rather this one centralized matrix 508 provides the data needed in the model view transform 402, the projective transform 406 and the perspective divide and view-port transform 408. Second, the processing by the lighting engine 410 is truly parallel. Since this embodiment of the geometry pipeline 304b provides a lighting engine 410 entirely separate from the ratio engine 516, the lighting processing can and is preferably done concurrently with the lighting engine 410 while the ratio engine 516 is used to perform the projective transform 406 and the perspective divide and view-port transform 408. This is particularly advantageous because it solves the problems of latency and storage capacity noted in the background of the invention.

Figure 9:
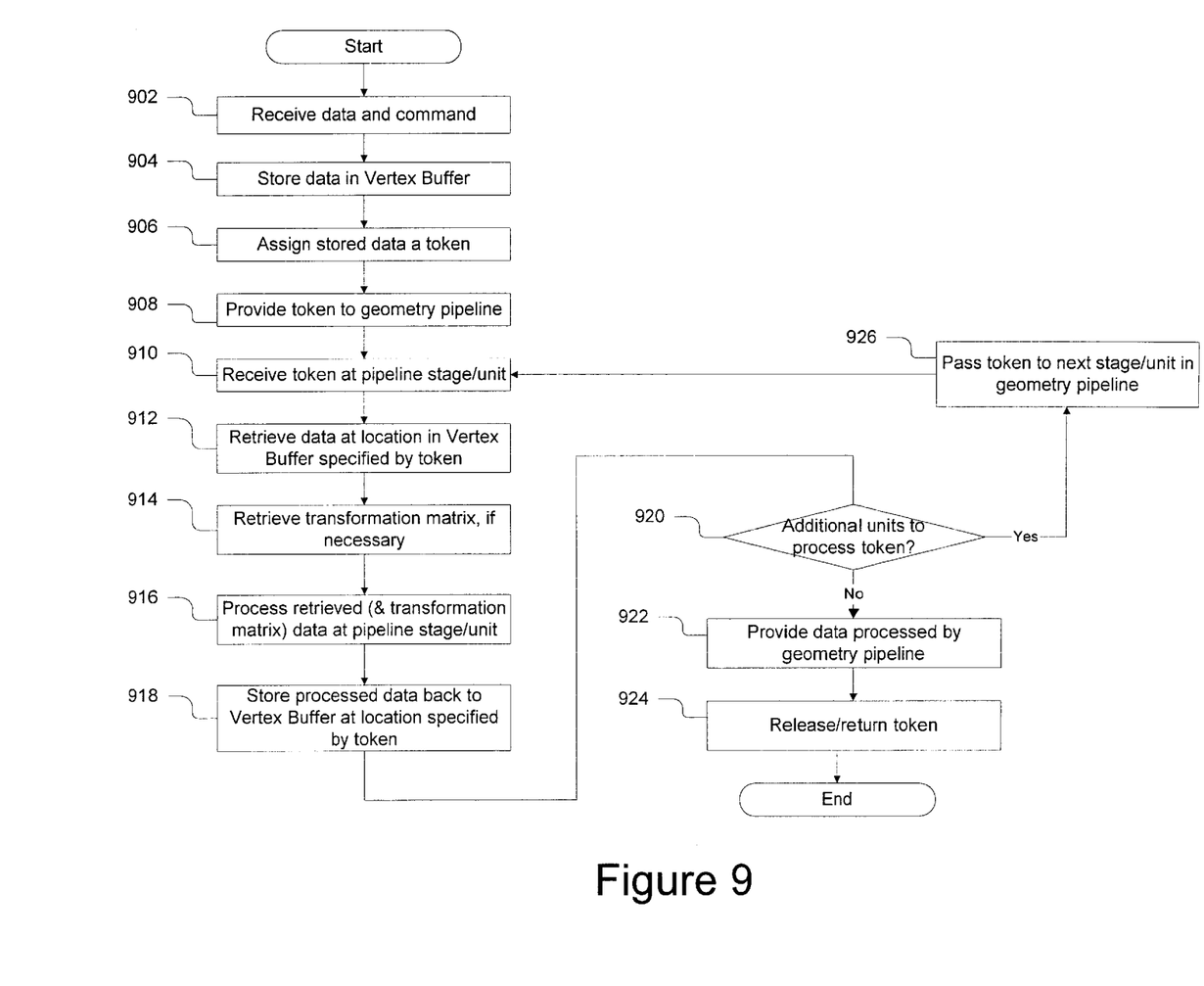
FIG. 9 is a flow chart of a method for processing of vertex data using the token-based management scheme of the present invention.

Referring now to FIG. 9, the preferred method for processing of vertex data using the token-based management scheme of the present invention will be described. The method begins in step 902 by receive data and command at the BCI unit 502. Then in step 904, the BCI unit 502 stores the data in the vertex buffer 506. The BCI unit 502 also assigns stored data a token using the new index module 510. Next in step 908, the token is send to the first stage in the geometry pipeline 504. The token is received at the stage in the geometry pipeline 504 in step 910. Then in step 912, the data at location specified by the token are retrieved from the vertex buffer 506. Then in step 914, the any transformation matrix need for the computation are retrieved, as necessary. In step 916, the retrieved data (and the retrieved transformation matrix, if needed) is processed at pipeline stage/unit by the ratio engine 516 in accordance with the operation performed by the pipeline stage. The processed data is then stored back into the vertex buffer at the location specified by the token in step 918. Then in step 920, the method tests whether there are additional units or stages that need to process the token. If there are the token is passed to the next stage and the processing continues in step 910 for the next stage. If not, the method is complete and the data processed by the geometry pipeline is provided in step 922 after which the token is release in step 924 so that it can be used for additional processing.

It is to be understood that the specific mechanisms and techniques that have been described are merely illustrative of one application of the principles of the invention. Numerous additional modifications may be made to the apparatus described above without departing from the true spirit of the invention.

What is claimed is:

1. A system for token-based buffering and processing of three-dimensional graphics, the system comprising:

a model view transformation unit having an input and an output, the input of the model view transformation unit coupled to receive a token that is an index to vertex data;

a Z clipping unit having an input and an output, the input of the Z clipping unit coupled to the output of the model view transformation unit;

a projection unit having an input and an output, the input of the projection unit coupled to the output of Z clipping unit;

a perspective transformation unit having an input and an output, the input of the perspective transformation unit coupled to the output of projection unit;

a lighting unit having an input and an output, the input of the lighting unit coupled to the output of Z clipping unit, the lighting unit operating concurrently with the projection unit or the perspective transformation unit;

a triangle rendering unit having an inputs and an output, a first input of the triangle rendering unit coupled to the output of the perspective transformation unit, a second input of the triangle rendering unit coupled to the output of the lighting unit; and a pixel rendering unit having an input and an output, the input of the pixel rendering unit coupled to the output of the triangle rendering unit, the pixel rendering unit providing data representing pixels at its output.

2. The system of claim 1, further comprising a vertex buffer, the vertex buffer storing vertex data, and the token including one or more addresses to the vertex buffer, the vertex buffer coupled to the model view transformation unit, the clipping unit, the projection unit, the perspective transformation unit, the lighting unit, the triangle rendering unit and the pixel rendering unit.

3. The system of claim 1, wherein the model view transformation unit receives vertex data in model or world space (Xo, Yo, Zo, Wo), and translates it into eye space (Xe, Ye, Ze, We).

4. The system of claim 1, wherein the clipping unit performs only Z (near or far) clipping in eye space.

5. The system of claim 1, wherein the projection unit performs a projective transform on the vertices to convert them from eye space (Xe, Ye, Ze, We) to clip space (Xc, Yc, Zc, Wc).

6. The system of claim 1, wherein the perspective transformation unit receives the token and performs a perspective divide and view-port transform on the vertex reference by the token by converting the vertex from clip space (Xc, Yc, Zc, Wc) to screen space (Xs, Ys, Zs, Ws).

7. The system of claim 1, wherein the lighting unit operates in parallel with the projection unit and the perspective transformation unit, and the lighting unit provides shading using any a Gouraud or Phong algorithm.

8. The system of claim 1, wherein the triangle rendering unit 412 receives color data from the lighting unit and the vertex data from the perspective transformation unit and the triangle rendering unit performs the x and y clipping.

9. A system for token-based buffering and processing of three-dimensional graphics, the system comprising:

a buffer control initialization unit having an input, a first output and a second output, for storing data and assigning tokens, the input of the buffer control initialization unit coupled to receive commands and vertex data;

a vertex buffer having a data input, a control input, and a data output, the vertex buffer for storing data that is indexed by tokens, the data input and control input coupled to the output of the buffer control initialization unit;

a ratio engine having a data input, a data output and a control input, the ratio engine for performing arithmetic and logic computations, the data input and the data output coupled to the input and output of the vertex buffer; and a geometry control pipeline having an input and an output, the geometry control pipeline for controlling the configuration of ratio engine to perform different computations of a geometry pipeline, the input of the geometry control pipeline coupled to the output of the buffer control initialization unit to receive tokens, and the output of the geometry control pipeline coupled to the control inputs of the vertex buffer and the control input of the ratio engine.

10. The system of claim 9, further comprising a new index module for indicating the next token available to reference a location in the vertex buffer, the new index module coupled to the geometry control pipeline and the buffer control initialization unit.

11. The system of claim 10, wherein the new index module is a pair of counters.

12. The system of claim 9, further comprising a request arbiter for determining which of a plurality of signals from the geometry control pipeline will be applied to the vertex buffer, the request arbiter determining priority based on position of a stage in the geometry pipeline.

13. The system of claim 12, further comprising a set of index multiplexers for coupling the geometry control pipeline to the vertex buffer, the set of index multiplexers determining the signal from the geometry control pipeline applied to the control input of the vertex buffer, the set of multiplexers being controlled by the request arbiter.

14. The system of claim 9, further comprising a transformation matrix, the transformation matrix coupled to the ratio engine and to the buffer control initialization unit, the transformation matrix providing matrices used to transform coordinates from one space to another.

15. The system of claim 9, wherein the geometry control pipeline further comprises:
 a model view transformation unit having an input and an output, the input of the model view transformation unit coupled to receive a token from the buffer control initialization unit;
 a Z clipping unit having an input and an output, the input of the Z clipping unit coupled to the output of the model view transformation unit;
 a lighting interface having an input and an output, the input of the lighting interface coupled to the output of Z clipping unit, the lighting interface providing data to the lighting engine and receiving data from the lighting engine and storing the data in a first triangle file;
 a projection unit having an input and an output, the input of the projection unit coupled to the output of the lighting interface;
 a perspective transformation unit having an input and an output, the input of the perspective transformation unit coupled to the output of projection unit; and
 a triangle rendering interface having an input and an output, the input of the triangle rendering unit coupled to the output of the perspective transformation unit, the triangle rendering interface receiving data from the vertex buffer and storing the data in a second triangle file, the triangle rendering interface also coupled to the buffer control initialization unit to release a token for additional use.

16. The system of claim 9, further comprising a triangle rendering unit having inputs coupled to receive the first and second triangle files, the triangle rendering unit performing x and y clipping.

17. The system of claim 9, further comprising a lighting engine for performing lighting operations and calculations, the lighting engine coupled to the geometry control pipeline to receive control signals, the vertex buffer to receive and send data and the transformation matrix to receive matrices.

18. The system of claim 9, wherein the vertex buffer is a 64×128 1R1W Megacell.

19. The system of claim 9, wherein the vertex buffer includes a plurality of entries, and one entry is reserved to identify a fan starting vertex and a plurality of entries are reserved for insertion entries for triangle vertices that may needed during a clipping operation.

20. A method for processing vertex data, the method comprising the steps of:
 storing received data in a buffer;
 assigning the stored data a token, the token being an index to a location in the buffer where the received data is stored;
 sending the token to a stage in a geometry pipeline;
 receiving the token at the stage in the geometry pipeline;
 retrieving from the buffer the data at a location specified by the token;
 processing the retrieved data with an engine configured as the next pipeline stage; and
 storing the processed data in the buffer at the location specified by the token.

21. The method of claim 20, further comprising the step of receiving data and a command at an initialization unit, and wherein the command dictates how the data will be stored in the buffer and the step of receiving initiates the steps of storing and assigning.

22. The method of claim 21, wherein the step of assigning is performed using a new index module that communicates with the an initialization unit.

23. The method of claim 20, wherein the geometry pipeline includes a model view transformation stage, a Z clipping stage, a lighting interface stage, a projection stage, a perspective transformation stage, and an a triangle rendering interface stage.

24. The method of claim 20, further comprising the step of retrieveing a transformation matrix need for the stage of the pipeline.

25. The method of claim 20, further comprising the steps of:
 determining whether there is a next stage that need to process the token; and
 if there is a next stage that need to process the token, repeating the steps of
  sending the token to the next stage in a geometry pipeline;
  receiving the token at the next stage in the geometry pipeline;
  retrieving from the buffer the data at a location specified by the token;
  processing the retrieved data with an engine configured as the next pipeline stage; and
  storing the processed data in the buffer at the location specified by the token.

26. The method of claim 20, further comprising the step of releasing the token so that it can be used for additional processing.

* * * * *